3,378,491
STABILIZED ORGANIC COMPOSITIONS
Milton Braid, Barrington, and Derek A. Law, Pitman, N.J., assignors to Mobil Oil Corporation, a corporation of New York
No Drawing. Filed Feb. 18, 1966, Ser. No. 528,351
23 Claims. (Cl. 252—47.5)

ABSTRACT OF THE DISCLOSURE

Lubricating oil compositions and other organic compositions normally subject to oxidation have improved stability by the presence of an arylazoarylamine or an arylazophenolic compound.

---

This invention relates to organic compositions possessing improved resistance to breakdown by oxidation, and particularly it relates to lubricant compositions having improved oxidation stability.

It is well-known that many organic liquids and solids used in industrial applications, such as, oils and greases, power transmission fluids, coatings, and the like, may deteriorate and lose their ability to function when subjected to oxidation. Since these substances are very often utilized at high temperatures at which oxidation is accelerated, the rate of breakdown may be very rapid. Thus the length of service for such organic materials may be drastically reduced. This problem is particularly important in the operation of modern day automotive and aircraft engines in which the breakdown of an oil, either natural or synthetic, is accompanied by the formation of corrosive acids, sludge and other products of oxidation. Such products interfere with the efficient operation of the lubricants and may even damage the engine.

It is a major object of this invention to provide novel organic compositions having improved oxidation stability. Another object is to provide novel compounds capable of providing lubricants with oxidation protection. These and other objects will be more apparent from the following description.

It has now been discovered that stable organic base media susceptible to the attack of oxidation deterioration may be prepared by adding thereto a minor proportion, effective to protect the same against such oxidation deterioration, of an arylazoaromatic hydrocarbon compound, arylazoarylamine or an arylazoarylhydroxy compound.

The additives used in accordance with this invention are compounds of the general structure

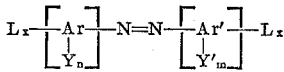

wherein Ar and Ar' may each be phenylene or naphthylene; Y and Y' may each be alkyl, aryl, alkoxy, aryloxy, alkaryl, aralkyl, amino, N-alkyl- or N-aryl-substituted amino, or arylazo, in which the number of carbon atoms for each alkyl radical may range from 1 to about 20; L is a hydroxy or an amino radical; and $m$ is from 0 to 5, $n$ is from 0 to 5, and $x$ is from 0 to 3.

When $x$ is 0, the resulting product is an arylazobenzene or naphthalene. When $x$ is 1 and L is amino, this group may be represented by the structure

wherein R and R' may each be hydrogen, alkyl, aryl, aralkyl, and alkaryl, in which the number of carbon atoms for each alkyl group may range from 1 to about 20, and the total number of carbon atoms is from 1 to about 40. The L group may also be hydroxy and hence arylazophenols and naphthols are contemplated in this invention. Fluids, particularly lubricant compositions, containing the arylazo compounds having the above described structures possess extraordinary high stability when subjected to temperatures under oxidizing conditions.

The arylazoaryl compounds used in this invention may be produced by a known procedure. Broadly, this procedure involves an initial reaction with an aniline or substituted aromatic amine to produce a diazonium intermediate salt. This reaction is followed by the coupling of an aromatic derivative, as a phenol or naphthol, or an aromatic amine thereto in a basic medium.

More specifically, in our preferred procedure, an aniline compound is mixed with hydrochloric acid, or other strong mineral acid, in water. To this aqueous acidic mixture is added a solution of sodium nitrite in water at a low temperature; i.e. from about 20° C. to about −10° C. The resulting product of this first step is a diazonium salt of the acid, for example the diazonium chloride. This salt is then added to the desired aromatic derivative, phenol or aromatic amine compound, depending on which $L_x$ group is desired. The addition is made in the presence of a base. If the amine reactant is used, usually a weak base, such as an alkali metal carboxylic salt, i.e. sodium acetate, at a temperature of below 20° C., may be employed. When the phenol reactant is used, the base is usually stronger, such as an alkali metal hydroxide. The resulting arylazo compound is often readily separated by simply filtering the reaction mass. Recrystallization may be performed in any suitable low boiling solvent. Unsubstituted arylazo compounds may be prepared by conventional procedures well known in the art, such as reduction of the appropriate nitroaromatics.

Within the general structure depicted hereinabove are encompassed compounds, many of which are novel compositions of matter, wherein the aromatic radicals are the same or different. The following three classes of compounds may be used.

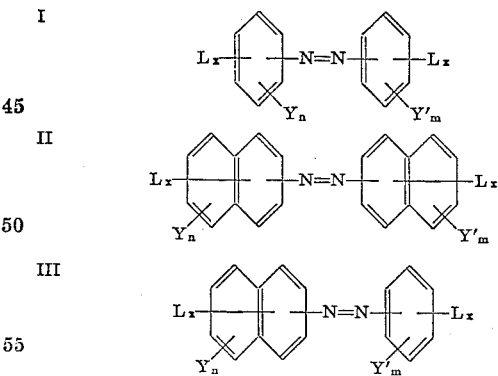

The functional groups L, Y and Y' and subscripts $m$, $n$ and $x$ have the same definition as given above.

Also contemplated in this invention are products prepared by using a diamino- or triamino-benzene or naphthalene as the aromatic reactant in the first step. Three or more aromatic radicals and two or more azo functions may occur in the same molecule. Such compounds which have been found useful in accordance with this invention have the formula

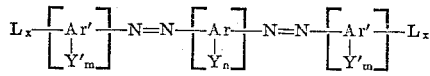

wherein L, Ar, Ar', Y, Y', $m$, $n$, and $x$ have the same definition as given above. The compounds are derivatives of diamino aryl reactants, such as phenylene diamine and naphthalene diamine, or bis(aminoaryl) compounds, wherein the Ar radical is

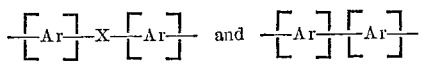

and X may be sulfur, oxygen, alkylene, or alkyl-substituted alkylene having from 1 to about 10 carbon atoms. Included in this feature of the invention as the initial azo-forming reactants are, for example, 4,4′ - diaminodiphenylmethane, 4,4′ - oxydianiline, or 4,4′ - diaminodiphenyl. The preferred bis(aminophenyl) compounds are as follows:

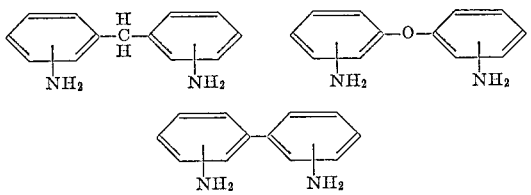

Binaphthyl and bianthracenyl compounds are, of course, also satisfactory reactants herein.

When L is the amino group, R and R′ can be hydrogen, alkyl or aryl as indicated above. Amines reactants containing such alkyl groups as methyl, ethyl, propyl, and such aryl groups as phenyl, naphthyl and tolyl are the most readily available commercially; they are used herein to illustrate this invention. It is preferred, however, that at least one of R or R′ be hydrogen.

The Y and Y′ substituents on the aromatic rings include alkyl, alkoxy, aryl, alkaryl, aralkyl, aryloxy, amino or substituted amino groups. Such groups consist most commonly of methyl, tert - butyl, ethyl, methoxy, ethoxy, phenoxy, phenyl, methylphenyl, nonylphenyl, anilino, dimethylamino, diethylamino and the like. These substituents may be present up to the available number of carbon atoms in the ring.

It has been discovered in accordance with this invention that the azoaryl compounds provide excellent antioxidant properties to organic compounds which may be prone to oxidative deterioration at high temperatures encountered during service, such as lubricating oils, lubricant greases, rubbers, resins, and the like, such as used in coatings, flexible sheeting; and structural articles. Of especial interest in this invention are lubricants, greases, transmission fluids, and other industrial fluids. Thus the base media include hydrocarbon mineral oils, olefin and polyolefin fluids, alkylene oxide fluids, polyaryl ether fluids, silicon-containing fluids, liquid polyacetate, and ester fluids. In the synthetic ester lubricants particularly, the compounds of this invention provide a relatively high degree of protection. Thus the base media used according to this invention include the esters of dicarboxylic acids and monohydric alcohols and the trimethylol propane and pentaerythritol esters of monocarboxylic acids. Suitable diesters include esters of oxalic, malonic, succinic, glutaric, adipic, pimelic, suberic, axelaic, and sebacic acids, and alcohols having from 1 to about 20 carbon atoms. A commonly used diester is di(2 - ethylhexyl) sebacate. With respect to the trimethylol propane and pentaerythritol esters, the acids used in forming these include those containing from 2 to about 30 carbon atoms, having straight or branched-chain aliphatic, carbocyclic and aromatic structures. Mixtures of one or more of such acids may also be used in the preparation of these tri- and tetra-esters. Typical carboxylic acids include acetic, propionic, butyric, valeric, isovaleric, caproic, caprylic, pelargonic, capric, isodecanoic, lauric and benzoic, nonylbenzoic, dodecylbenzoic, naphthoic, cyclohexane carboxylic acid and the like. The acids most particularly preferred are pelargonic acid and valeric acid.

A typical preferred ester lubricant is the esterification product of technical grade pentaerythritol (containing up to about 12% of dipentaerythritol), and a mixture of pelargonic acid and commercial valeric acid (containing about 2 to 1 by weight of normal valeric to isovaleric).

We find that the arylazo compounds of this invention are sufficiently soluble in these mineral and synthetic oils to obtain satisfactory stabilizing effect. Suitable concentrations range from about 0.001% to about 10% by weight of total lubricant composition of the additive, preferably from about 0.1% to about 5%.

The following specific examples illustrate the various aspects of this invention without limiting it. All parts and percents are on a weight basis unless otherwise specified.

Example 1.—Preparation of 1 - phenylazo - N - phenyl-2 - naphthylamine

In a suitable reactor was added 31 parts of aniline dissolved in 160 parts of 18% hydrochloric acid. To this solution was added dropwise 23 parts of sodium nitrite in 75 parts of water. The temperature of the reaction mixture was maintained in the range of 0 to 3° C. The resulting solution of benzene diazonium chloride held at a temperature of 0° was added to a suspension of 55 parts of N - phenyl - 2 - naphthylamine and 80 parts of sodium acetate in 1000 parts of ethanol. The reaction mixture was warmed to reflux and then cooled to room temperature and the product filtered off. The product was washed with cold water and cold ethanol and finally air dried leaving 69.9 parts (87% theory) of a scarlet powder; M.P. 123–128° C. This powder was recrystallized from acetone, the crystals having an M.P. of 143° to 144° C. The total yield was up to 96%.

Product analysis.—Calc'd: C, 81.71%; H, 5.29%; N, 12.99%. Found: C, 80.96%; H, 5.34%; N, 12.50%.

Example 2.—Preparation of 4-phenylazophenol

Into a suitable reactor were added 46.5 parts of aniline in 250 parts of a 18% hydrochloric acid solution. The mixture was cooled to 0° C. and a solution of 35 parts of sodium nitrite in 100 parts of water was added dropwise thereto. The resulting solution was in turn added dropwise to an ice-cold solution of 47 parts of phenol and 30 parts of sodium hydroxide in 300 parts of water. After one hour, a yield of 95 parts of a purple-brown suspension of the required product was filtered off and washed with water; M.P. 151° to 152° C.

Product analysis.—Calc'd: H, 14.3%. Found: N, 14.0%.

An alternative method of producing the above product may be followed by adding to the benzenediazonium chloride mixture 900 parts of ice water and 30 parts of solid calcium carbonate. The reaction mixture is warmed to room temperature with stirring for 40 hours. The resulting suspension is acidified with further amounts of hydrochloric acid and the resulting product in suspension is filtered off.

Example 3.—Preparation of 4,4′-bis(2-hydroxy-1-naphthylazo)diphenyl ether

In a suitable reactor, a solution of 20 parts of oxydianiline in 250 parts of 10% hydrochloric acid was cooled to 0° C. To this solution was added dropwise a solution of 14 parts of sodium nitrite and 50 parts of water. The resulting mixture was added dropwise to an ice cold solution of 28.8 parts of betanaphthol and 12 parts of sodium hydroxide in 400 parts of 50% aqueous methanol solution. The reaction mixture was maintained at 0° C. for 30 minutes and the resulting crimson solid product was filtered off, washed with cold water and then with methanol and air dried. Yield of crude product was 50.6 parts (99%). The crude product was recrystallized from toluene, M.P. 223° to 224° C.

Product analysis.—Calc'd: C, 75.27%; H, 4.35%; N, 10.97%. Found: C, 73.5%; H, 4.36%; N, 9.91%.

Example 4.—Preparation of 4,4′-bis(2-hydroxy-5-nonylphenylazo)diphenylmethane

In a suitable reactor 19.8 parts of 4,4′-diamino diphenylmethane in 140 parts of 18% hydrochloric acid was heated to 75° C.; the mixture was then cooled to −5° C. To the resulting suspension was added dropwise a solution of 14.5 parts of sodium nitrite in 50 parts of water while maintaining the temperature between −5° and 0° C. The clear orange-colored solution of the resulting product was added to a solution of 44 parts of nonylphenol and 20 parts of sodium hydroxide in 300 parts of methanol. The addition period took 10 minutes. A semisolid orange-colored product was filtered off and washed with cold water. The water was removed as an azeotrope with benzene; the remaining benzene was removed under vacuum, leaving 61 parts (93%) of a red brown grease.

Product analysis.—Calc'd: N, 8.54%; molecular wt. 660. Found: N, 6.96%; molecular wt. 610.

EVALUATION OF PRODUCTS

Lubricant compositions were prepared for evaluation using as the base fluid a pentaerythritol ester produced from the reaction of about one mole of pelargonic acid, about three moles of commercial valeric acid, and about one mole of technical grade pentaerythritol. To this base ester were added the arylazo compounds of this invention, the additives being employed at various concentrations.

These sample compositions were tested in a bulk oil catalytic oxidation test similar to that described in U.S. Patent No. 3,197,404. The oil test sample is heated to a temperature of 375° F. or 425° F. A stream of dry air at a rate of about 5 liters per hour is passed through the sample for 24 hours in the presence of metals which tend to catalyze oxidation, i.e. (a) 15.6 sq. in. of sand-blasted iron wire, (b) 0.78 sq. in. of polished copper wire, (c) 0.87 sq. in. of polished aluminum wire and (d) 0.167 sq. in. of polished lead surface. The antioxidant activity of the additive is measured by the ability of the additive to maintain the neutralization number (or acid number) and the kinematic viscosity of the oil composition close to the original value. Oxidation tends to increase both of these characteristics.

The results of this test are tabulated below in Table I, for compositions containing the arylazoarylamines and azobenzene.

| Sample | Conc. | 24 Hours at 375° F. | | 24 Hours at 425° F. | |
|---|---|---|---|---|---|
| | | ΔNN | ΔKV, Percent | ΔNN | ΔKV, Percent |
| No additive | | 7.9 | 265 | 5–9 | 390 |
| 4-phenylazoaniline | 2 | | | 2.1 | 20 |
| | 1 | | | 2.4 | 10 |
| 4-phenylazodiphenylamine | 2 | | | 4.2 | 24 |
| | 1 | | | 2.0 | 10 |
| 4-phenylazo-1-naphthylamine | 2 | | | 1.2 | 1 |
| | 1 | | | 2.5 | 16 |
| 4-phenylazo-N-phenyl-1-naphthylamine | 2 | 0.8 | 9 | 1.2 | 16 |
| | 1 | 0.6 | 5 | 1.2 | 11 |
| | 0.5 | 0.6 | 8 | 0.7 | 15 |
| 1-phenylazo-N-phenyl-2-naphthylamine | 2 | 0.6 | 8 | 0.7 | 13 |
| | 1 | 0.4 | 3 | 0.7 | 23 |
| | 0.5 | 0.4 | 3 | 1.8 | 39 |
| N,N-dimethyl-p-1-naphthylazoaniline | 1 | | | 0.8 | 11 |
| | 0.5 | | | 2.4 | 25 |
| N-N,dimethyl-p-(m-tolylazo)aniline | 2 | | | 1.2 | 14 |
| | 1 | | | 1.5 | 22 |
| Azobenzene | 2 | | | 3.3 | 58 |
| | 1 | | | 3.6 | 83 |

The same catalytic oxidation test was repeated using arylazophenol compounds in the test samples at different cvoncentrations. The results are tabulated below in Table II.

TABLE II

| Sample | Conc. | 24 Hours at 375° F. | | 24 Hours at 425° F. | |
|---|---|---|---|---|---|
| | | ΔNN | ΔKV, Percent | ΔNN | ΔKV, Percent |
| No additive | | 7.9 | 265 | 5–9 | 390 |
| 2-phenylazo-p-cresol | 2 | 0.47 | 6 | 3.3 | 58 |
| | 1 | 0.48 | 10 | 4.4 | 108 |
| | 0.5 | 5.7 | 103 | 5.4 | 163 |
| 2-phenylazo-4-t-butylphenol | 2 | 4.1 | 71 | 2.3 | 35 |
| | 1 | 2.6 | 10 | 3.7 | 83 |
| | 0.5 | 1.5 | 3 | 4.1 | 84 |
| 3-tolylazo-p-cresol | 2 | 0.93 | 6 | | |
| | 1 | 0.72 | 6 | | |
| 4-phenylazophenol | 2 | [1]−ve | 2 | | |
| | 1 | −ve | 7 | | |
| | 0.5 | −ve | 7 | | |
| 4-phenylzao-2,6-xylenol | 2 | 1.0 | 27 | | |
| | 1 | 4.2 | 47 | | |
| | 0.5 | 6.2 | 119 | | |
| 4,4′bis(2-hydroxy-5-nonylphenylazo)diphenyl methane | 2 | 0.7 | 9 | 1.8 | 28 |
| | 1 | 0.7 | 6 | 2.6 | 42 |
| | 0.5 | 0.7 | 6 | 5.9 | 143 |
| 4-phenylazoresorcinol | 1 | 1.2 | 2 | | |
| | 0.5 | 0.5 | 2 | | |
| 1-phenylazo-2-naphthol | 2 | | | 3.7 | 52 |
| | 1 | | | 2.8 | 59 |
| | 0.5 | | | 2.6 | 43 |

[1] −ve indicates negative variation.

In a similar catalytic oxidation test, 4-phenylazo-N-phenyl-1-naphthylamine was added to a solvent-refined neutral mineral oil stock having an S.U.S at 210° F. of 1300 seconds and subjected to oxidation in the presence of the catalytic metals according to the procedure as above described except that the test was performed at 325° F. for a period of 40 hours. The results obtained from this test was tabulated in Table III, below.

TABLE III

| Additive Conc., Wt. Percent | ΔNN | ΔKV, Percent |
|---|---|---|
| 0 | 19.3 | 460 |
| 0.25 | 15.4 | 243 |
| 0.5 | 13.6 | 271 |
| 1.0 | 12.6 | 144 |
| Less than 2 | 8.4 | 102 |

The same mineral oil base stock was also tested using as the antioxidant 1-phenylazo-2-naphthol. The results of this test were as follows:

TABLE IV

| Additive Conc., Wt. Percent | Δ NN | Δ KV, Percent |
|---|---|---|
| 0 | 19.3 | 460 |
| 0.5 | 18.7 | 264 |
| 1.0 | 21.6 | 378 |
| Less than 2 | 16.8 | 263 |

The arylazo compounds of this invention evidence the ability to prevent corrosion of silver and copper in mineral oils using standard corrosion tests.

Silver corrosion test

In the following evaluation 4-phenylazo-N-phenyl-1-naphthylamine was tested in a mixture of solvent-refined base stocks consisting of (1) a neutral, Grade A mineral oil having an S.U.S. at 210° F. of 55 to 60 seconds and (2) a coastal, Bright Stock having an S.U.S. at 210° F. of 155 to 160 seconds, using a silver corrosion test method developed by the Eelectromotive Division of General Motors Corporation, designated EMD Silver Corrosion Test Number L.O. 201–47. The procedure consists of heating 300 milliliters of the sample lubricating oil at a temperature of about 325° F. At that temperature, a weighed section of a silver-plated wrist pin bushing (about 3 inches by 1 inch by ¼ inch) is suspended in the oil to about 75% immersion of the surface area. After 72 hours of this immersion the section is removed from the oil.

The lubricant sample is measured before and after the test to determine changes in viscosity, acidity i.e. total acid and base numbers, the quantity of material insoluble in pentane formed during the test and the change of pH. Demerits are provided for these various changes in the lubricants. The rating schedule by which the demerits may be calculated are as follows:

Demerit for every viscosity increase of 30 S.U.S. at 100° F. _____ 1
Demerit for every 3% viscosity increase at 100° F. __ 1
Demerits for each unit of total acid number and base number _____ 4
Demerits for every pH change of 3.0 _____ 10
Demerits for every 1% of pentane insolubles formed __ 8

Four oil compositions were tested. Composition A is the oil alone; Composition B is the oil plus 0.4% by weight of phenyl-alpha-naphthylamine (PAN), a known antioxidant; Composition C is the oil plus 0.3% by weight of 4,4'-methylenebis(2,6-di-tert-butylphenol), also a known antioxidant; and Composition D is the oil plus 0.3% by weight of 4-phenylazo-N-phenyl-1-naphthylamine. Each of the compositions also contained 5% of a combined barium-calcium salt of a sulfonate and a phenate as a detergent. The following results were obtained.

TABLE V

| Composition | Additive | Total Demerits |
|---|---|---|
| A | None | 29.7 |
| B | 0.4% PAN | 23.4 |
| C | 0.3% bisphenol | 25.3 |
| D | 0.3% 4-phenylazo-N-phenyl-1-naphthylamine. | 18.3 |

Copper corrosion test

In this test, the copper strip is immersed in the sample lubricant for three hours at 250° C. At the end of this period the copper strip is removed, cleaned and dried. The corrosiveness of the lubricant composition toward copper is based on the rating of the surface characteristics of the copper strip. The rating reference to a color scale rating is from 1A to 4C. 1A indicates a perfectly clean copper surface, while 4C indicates extensive corrosion. The intermediate ratings range from moderate to very serious corrosive action by the lubricant composition on the copper. Mineral oils without any additives yield a copper rating of 1A. When 0.2% by weight of 1-phenylazo-N-phenyl-2-naphthylamine is added, the copper strip also has a 1A rating. In comparison, 6% by weight of a sulfurized triisobutylene antioxidant in the oil resulted in a copper color rating of 4A showing a high degree of corrosion. The combination of 4% by weight of the sulfurized triisobutylene and 0.2% by weight of 1-phenylazo-N-phenyl-2-naphthylamine had a copper corrosion rating of 2A, indicating considerable improvement over the 6% oil blend of the sulfurized triisobutylene alone.

It is thus seen from the above results that the additives of this invention successfully retard or inhibit the attack of oxidation on synthetic ester and mineral oil lubricant compositions; the additives are also safe for use in the presence of silver and copper surfaces. In fact, they unexpectedly provide protection for these metal surfaces in the presence of corrosive sulfur-containing additives, such as sulfurized hydrocarbon, sulfurized oils and fats and other sulfurized organic compounds.

The compositions of this invention may be used in modern industrial applications, such as in hydraulic systems or in the lubrication of automotive or aircraft jet engines as well as in other engines or machines requiring a high stability fluid in which high temperatures or catalytic metals could normally hasten attack of oxidation. Other additives may of course be employed along with the arylazo compounds, such as pour point depressors, viscosity index improvers, metal deactivators and metal suppressants.

This invention has been described by the use of specific illustrations for the purpose defining and illustrating the invention without being limited thereby except as in the following claims.

We claim:

1. A lubricating composition susceptible to oxidative deterioration at elevated temperatures containing in an amount sufficient to give antioxidant properties thereto an arylazo compound having the structure:

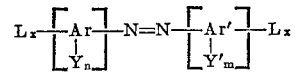

wherein Ar and Ar' are each selected from the group consisting of phenylene and naphthalene; Y and Y' are each selected from the group consisting of alkyl, aryl, alkaryl, aralkyl, alkoxy, aryloxy, amino, N-alkylamino, N-arylamino, and arylazo in which the number of carbon atoms in each of the alkyl groups is from 1 to 20; L is selected from the group consisting of hydroxy and amino; and $m$ is 0 to 5, $n$ is 0 to 5, and each $x$ is 0 to 3 and may be the same and different, and when each $m$, $n$ and $x$ is 0, the aromatic ring contains the hydrogen atom normally attached thereto.

2. The composition of claim 1, wherein $x$ is 1 and L is hydroxy.

3. The composition of claim 1, wherein $x$ is 1 and L is the radical,

wherein R and R' are each selected from the group consisting of hydrogen, alkyl, aryl, alkaryl and aralkyl, in which the total number of carbon atoms for each group may range from 1 to about 40.

4. The composition of claim 1, wherein the lubricating composition is a synthetic ester lubricant.

5. The composition of claim 4, wherein the synthetic ester lubricant is prepared by the reaction of a pentaerythitol and a monocarboxylic acid having from 2 to about 30 carbon atoms.

6. The composition of claim 5, wherein the monocarboxylic acid used in the preparation of the ester lubricant is a mixture of monocarboxylic acids.

7. The composition of claim 6, wherein the acids are pelargonic and valeric acids.

8. The composition of claim 1, wherein Ar' is phenylene.

9. The composition of claim 1, wherein Ar' is naphthalene.

10. The composition of claim 1, wherein the compound is azobenzene.

11. The composition of claim 1, wherein the compound is 4-phenylazo aniline.

12. The composition of claim 1, wherein the compound is 4-phenylazo-N-phenyl-1-naphthylamine.

13. The composition of claim 1, wherein the compound is 1-phenylazo-N-phenyl-2-naphthylamine.

14. The composition of claim 1, wherein the compound is 4-phenylazophenol.

15. The composition of claim 1, wherein one Y is the radical

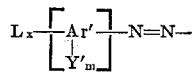

the said compound having the structure

wherein Ar and Ar' are each selected from the group consisting of phenylene, naphthylene, biphenylene and binaphthylene; Y and Y' are each selected from the group consisting of alkyl, aryl, alkaryl, aralkyl, alkoxy, aryloxy, amino, N-alkylamino, N-arylamino, and arylazo in which L is selected from the group consisting of hydroxy and amino, and $m$ is 0 to 5, $n$ is 0 to 5, and $x$ is 0 to 3 and when each $m$, $n$, and $x$ is 0, the aromatic ring contains the hydrogen atom normally attached thereto.

16. The composition of claim 15, wherein

is selected from the group consisting of

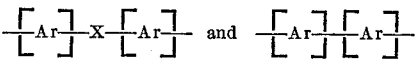

wherein X is selected from the group consisting of oxo, thio, alkylene, and alkyl-substituted alkylene.

17. The composition of claim 16, wherein the compound is 4,4'-bis(2-hydroxy-5-nonylphenylazo)diphenylmethane.

18. The composition of claim 16, wherein the compound is 4,4'-bis(2-hydroxy-1-naphthylazo)diphenylether.

19. The composition of claim 1, wherein the composition also contains a copper-corrosive sulfurized organic compound.

20. The composition of claim 19, wherein the sulfur compound is a sulfurized hydrocarbon.

21. The composition of claim 19, wherein the sulfur compound is a sulfurized triisobutylene.

22. The composition of claim 21, wherein the arylazo compound is 1-phenylazo-N-phenyl-2-naphthylamine.

23. The composition of claim 1, wherein the composition is a mineral oil lubricant.

References Cited
UNITED STATES PATENTS

| | | | |
|---|---|---|---|
| 1,656,233 | 1/1928 | Penny | 8—6 |
| 1,893,543 | 1/1933 | Felix | 8—6 |
| 1,914,549 | 6/1933 | Woodward | 8—6 |
| 1,958,758 | 5/1934 | Krzikalla et al. | 8—6 |
| 1,986,116 | 1/1935 | Payne | 8—6 |
| 2,055,050 | 9/1936 | Rohrbach | 8—6 |
| 2,087,282 | 7/1937 | Friedrich et al. | 8—6 |
| 2,925,333 | 2/1960 | Thompson | 44—59 |
| 3,010,905 | 11/1961 | Odell et al. | 252—51.5 |
| 3,076,698 | 2/1963 | Orelup | 252—50 |
| 3,206,454 | 9/1965 | Merian et al. | 8—41 |

DANIEL E. WYMAN, *Primary Examiner.*

I. VAUGHN, *Assistant Examiner.*